(12) United States Patent
Rambo (10) Patent No.: US 11,296,970 B2
(45) Date of Patent: Apr. 5, 2022

(54) METHOD FOR DETECTING A DISRUPTION IN A VEHICLE'S COMMUNICATION SYSTEM BY CHECKING FOR ABNORMALITIES IN COMMUNICATION

(71) Applicant: Robert Bosch GmbH, Stuttgart (DE)

(72) Inventor: Joshua Rambo, Wixom, MI (US)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 16/619,374

(22) PCT Filed: Apr. 11, 2018

(86) PCT No.: PCT/EP2018/059212
§ 371 (c)(1),
(2) Date: Dec. 4, 2019

(87) PCT Pub. No.: WO2018/233889
PCT Pub. Date: Dec. 27, 2018

(65) Prior Publication Data
US 2020/0162361 A1  May 21, 2020

Related U.S. Application Data

(60) Provisional application No. 62/524,068, filed on Jun. 23, 2017.

(51) Int. Cl.
*H04L 12/26* (2006.01)
*H04L 43/50* (2022.01)
*H04L 43/0823* (2022.01)

(52) U.S. Cl.
CPC .......... *H04L 43/50* (2013.01); *H04L 43/0823* (2013.01)

(58) Field of Classification Search
CPC . H04L 43/50; H04L 43/0823; H04L 63/1425; G06F 11/2289; G06F 11/3051; G06F 21/554
(Continued)

(56) References Cited

U.S. PATENT DOCUMENTS 8,955,130 B1 2/2015 Kalintsev et al.
9,560,071 B2 1/2017 Ruvio et al.
(Continued)

FOREIGN PATENT DOCUMENTS

DE  102012224234 A1  6/2014
EP  3096257 A1  11/2016
(Continued)

OTHER PUBLICATIONS

International Search Report and Written Opinion dated Jul. 11, 2018, Appl. No. PCT/EP2018/059212, filed Apr. 11, 2018.
(Continued)

*Primary Examiner* — Gbemileke J Onamuti
(74) *Attorney, Agent, or Firm* — Michael Best & Friedrich LLP (57) ABSTRACT

A system for detecting a disruption in a communication system of a vehicle. The system includes a vehicle bus and an electronic processor. The electronic processor is configured to receive a message, from a vehicle bus. The message has a format and a plurality of signals. The electronic processor is configured to detect anomalies in a bus identifier, the message format, a time the message is received, and a signal parameter of a signal of the plurality of signals. The electronic processor is also configured to generate an error if an anomaly is detected in the message format, an anomaly is detected in the time the message is received, or an anomaly is detected in the signal parameter of the signal of the plurality of signals.

20 Claims, 9 Drawing Sheets

(58) Field of Classification Search
USPC .......................................................... 370/242
See application file for complete search history.

(56) References Cited

U.S. PATENT DOCUMENTS

| | | |
|---|---|---|
| 9,794,286 B2 | 10/2017 | Otsuka et al. |
| 2005/0283831 A1 | 12/2005 | Ryu et al. |
| 2006/0036727 A1 | 2/2006 | Kurapati et al. |
| 2006/0123481 A1 | 6/2006 | Bhatnagar et al. |
| 2008/0178294 A1 | 7/2008 | Hu et al. |
| 2010/0318794 A1 | 12/2010 | Dierickx |
| 2012/0210178 A1 | 8/2012 | Schelkle et al. |
| 2013/0212680 A1 | 8/2013 | Winn et al. |
| 2014/0165191 A1 | 6/2014 | Ahn et al. |
| 2015/0113638 A1 | 4/2015 | Valasek et al. |
| 2015/0150124 A1 | 5/2015 | Zhang et al. |
| 2015/0172306 A1 | 6/2015 | Kim et al. |
| 2015/0191135 A1 | 7/2015 | Ben Noon et al. |
| 2015/0191136 A1 | 7/2015 | Ben Noon et al. |
| 2015/0191151 A1 | 7/2015 | Ben Noon et al. |
| 2016/0359893 A1* | 12/2016 | Kishikawa ........ H04L 12/40013 |
| 2016/0381055 A1 | 12/2016 | Galula et al. |
| 2016/0381059 A1 | 12/2016 | Galula et al. |
| 2016/0381067 A1 | 12/2016 | Galula et al. |
| 2016/0381068 A1 | 12/2016 | Galula et al. |
| 2017/0013005 A1 | 1/2017 | Galula et al. |
| 2018/0152472 A1 | 5/2018 | Amano et al. |

FOREIGN PATENT DOCUMENTS

| | | |
|---|---|---|
| EP | 3113529 A1 | 1/2017 |
| JP | 2007067812 A | 3/2007 |
| JP | 2014236248 A | 12/2014 |
| JP | 2016134913 A | 7/2016 |
| WO | 2014061021 A1 | 4/2014 |
| WO | 2014115455 A1 | 7/2014 |
| WO | 2015159486 A1 | 10/2015 |
| WO | 2016046819 A1 | 3/2016 |
| WO | 2016151566 A1 | 9/2016 |
| WO | 2017021970 A1 | 2/2017 |

OTHER PUBLICATIONS

Japanese Patent Office Action for Application No. 2019-570917 dated Jan. 25, 2021 (4 pages including machine translation).

* cited by examiner

METHOD FOR DETECTING A DISRUPTION IN A VEHICLE'S COMMUNICATION SYSTEM BY CHECKING FOR ABNORMALITIES IN COMMUNICATION

RELATED APPLICATIONS

The present application claims priority to U.S. Provisional Application No. 62/524,068, filed Jun. 23, 2017, the entire contents of which is hereby incorporated by reference.

FIELD

Embodiments relate to detecting possible intrusions and disruptions of a vehicle's communication system.

BACKGROUND

Modern vehicles are equipped with numerous computers and electrical components that control various vehicle systems. These computers and components communicate by sending and receiving messages to and from each other.

SUMMARY

The messages that computers and components send and receive include a message identifier followed by a plurality of signals. It is possible to change a vehicle's behavior by disrupting communication between computers and electrical components in the vehicle. With the increased reliance on and use of computer-controlled systems comes the risk of messages and signals being falsely transmitted due to anomalies caused by unexpected vehicle behavior or attacks from outside sources. An intrusion detection system can be used to detect these potential anomalies. The undesired outcomes resulting from messages being improperly transmitted include driver annoyance, driver distraction, or changes in vehicle behavior.

Embodiments provide, among other things, a system for detecting a disruption in a communication system of a vehicle. The system includes a vehicle bus and an electronic processor. The electronic processor is configured to receive a message, from a vehicle bus. The message has a format and a plurality of signals. The electronic processor is configured to detect anomalies in a bus identifier, the message format, a time the message is received, and a signal parameter of a signal of the plurality of signals. The electronic processor is also configured to generate an error if an anomaly is detected in the message format, an anomaly is detected in the time the message is received, or an anomaly is detected in the signal parameter of the signal of the plurality of signals.

Another embodiment provides a method for detecting a disruption in a communication system of a vehicle. The method includes receiving, with an electronic processor, a message from a vehicle bus. The message received from the vehicle bus has a format and plurality of signals. The method also includes testing the message, with the electronic processor, by detecting an anomaly in a bus identifier, detecting an anomaly in the format of the message, detecting an anomaly in a time a message is received and detecting an anomaly in a signal parameter of a signal of the plurality of signals. The method also includes generating an error if the anomaly in the format of the message, the anomaly in the time the message is received, or the anomaly in the signal parameter of the signal of the plurality of signals is detected.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
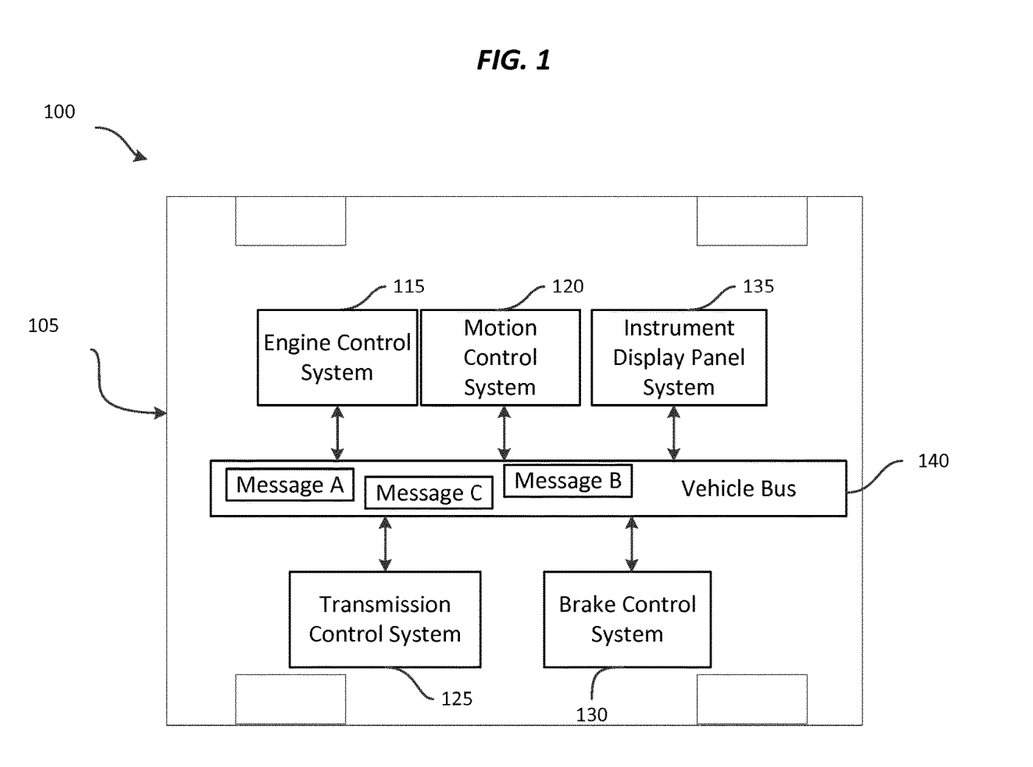
FIG. 1 is a simplified diagram of a vehicle including a communication system.

FIG. 1 illustrates a communication system 100 of a vehicle 105. The vehicle 105, although illustrated as a four-wheeled vehicle, may encompass various types and designs of vehicles. For example, the vehicle 105 may be an automobile, a motorcycle, a truck, a bus, a semi-tractor, and others. In the example illustrated, the communication system 100 allows several systems to communicate with each other by sending messages to each other via various wired or wireless connections. Examples of systems which communicate with each other are an engine control system 115, a motion control system 120, a transmission control system 125, a brake control system 130, and the instrument panel display system 135. These systems may be of various constructions and may use various communication types and protocols. In other embodiments, systems which communicate with each other are communicatively coupled via a shared communication link such as a vehicle communication bus (vehicle bus) 140 (for example, a controller area network (CAN) bus) or a wireless vehicle network.

Each of the above-listed systems interacting with each other over the communication system 100 may include dedicated processing circuitry including an electronic control unit for receiving, processing, and transmitting data associated with the functions of each system. For example, the engine control system 115 may include an electronic control unit that receives messages, checks that there are no potentially harmful anomalies associated with the received messages, and sends messages. The embodiment illustrated in FIG. 1 provides but one example of the components and connections of the communication system 100. It should be understood that these components and connections may be constructed in ways other than those illustrated and described herein.

Figure 2:
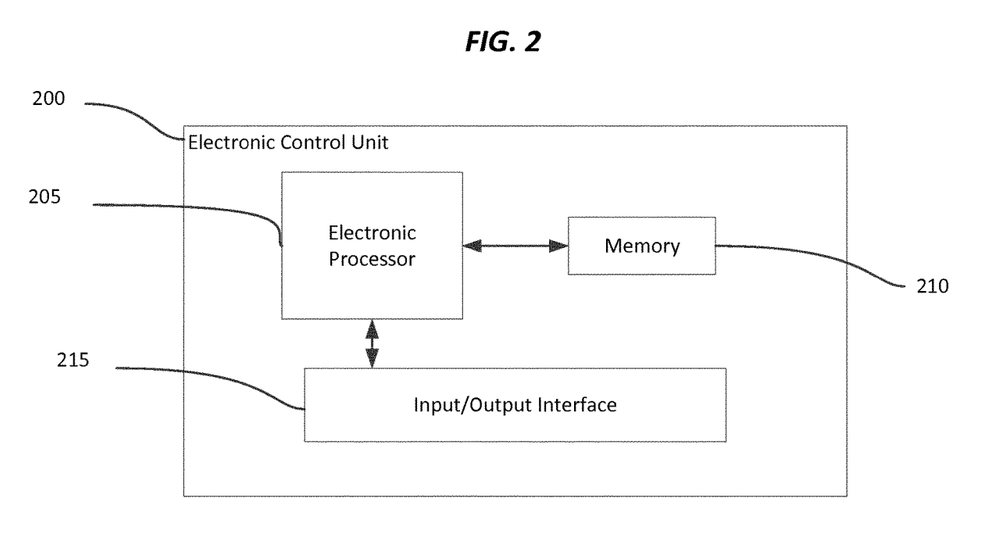
FIG. 2 is a diagram of an electronic control unit configured to receive and analyze messages.

FIG. 2 is a block diagram of an electronic control unit 200 of the communication system 100. The electronic control unit 200 includes a plurality of electrical and electronic components that provide power, operation control, and protection to the components and modules within the electronic control unit 200. The electronic control unit 200 includes, among other things, an electronic processor 205 (such as a programmable electronic microprocessor, microcontroller, or similar device), a memory 210 (for example, non-transitory, machine readable memory), and an input/output interface 215. It should be understood that the electronic control unit 200 is illustrated in FIG. 2 as having a single input/output interface 215 purely for illustrative purposes. The electronic control unit 200 may have any number of input/output interfaces and the single input/output interface 215 illustrated herein should not be considered in any way limiting. The electronic processor 205 is communicatively connected to the memory 210 and the input/output interface 215. The electronic processor 205, in coordination with the memory 210 and the input/output interface 215, is configured to implement, among other things, the methods described herein.

The electronic control unit 200 may be implemented in several independent controllers (for example, programmable electronic control units) each configured to perform specific functions or sub-functions. Additionally, the electronic control unit 200 may contain sub-modules that include additional electronic processors, memory, or application specific integrated circuits (ASICs) for handling input/output functions and application of the methods listed below. In other embodiments, the electronic control unit 200 includes additional, fewer, or different components.

Figure 3:
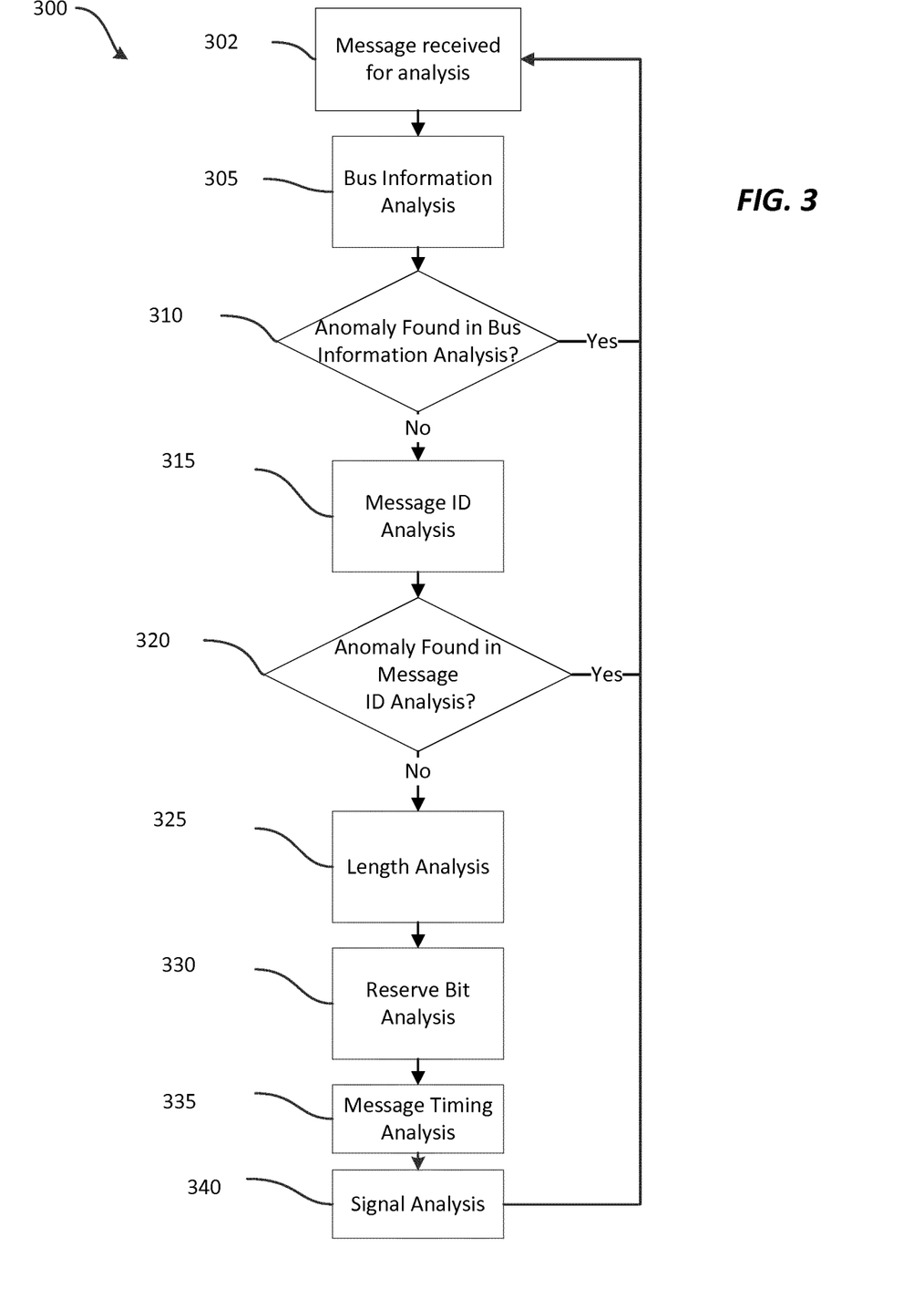
FIG. 3 is a flowchart of a method for determining if a communication system (for example, the system of FIG. 1) has been compromised (for example, hacked).

FIG. 3 illustrates an example method 300 for determining if the communication system 100 is compromised. In the example provided, when a message is received (block 302), a series of tests are performed to make sure the message will not corrupt any of the systems of the vehicle 105. First, a bus identifier of a bus (for example, the vehicle bus 140) that the message is received from is analyzed (block 305). If no anomaly is found during the analysis of the bus identifier, the format of the message is analyzed. The format of the message includes, for example, a message identifier, a length of the message, and reserved bits of the message. The time that the message is received (the rate that messages are received) is also analyzed. In some embodiments, the message identifier is analyzed first (block 315). If the message identifier is known (no anomaly is found in the message identifier (block 320)), the length of the message is analyzed (block 325), the reserved bits of the message are analyzed (block 330), the rate that messages are received is analyzed (block 335) and signal parameters of one or more signals included in the message are analyzed (block 340). After completing the analysis of the message, the method 300 waits for the electronic control unit 200 to receive a new message (block 302). In some embodiments, the electronic processor 205 may perform tests additional to the tests described as being performed in the method 300. In other embodiments the electronic processor 205 may analyze the message in fewer steps than described in the method 300. The number of tests that the electronic processor 205 performs on a message may depend on the results of the tests that the electronic processor 205 has performed on the message. Each of the analysis steps or tests of the method 300 are described in further detail below.

Figure 4:
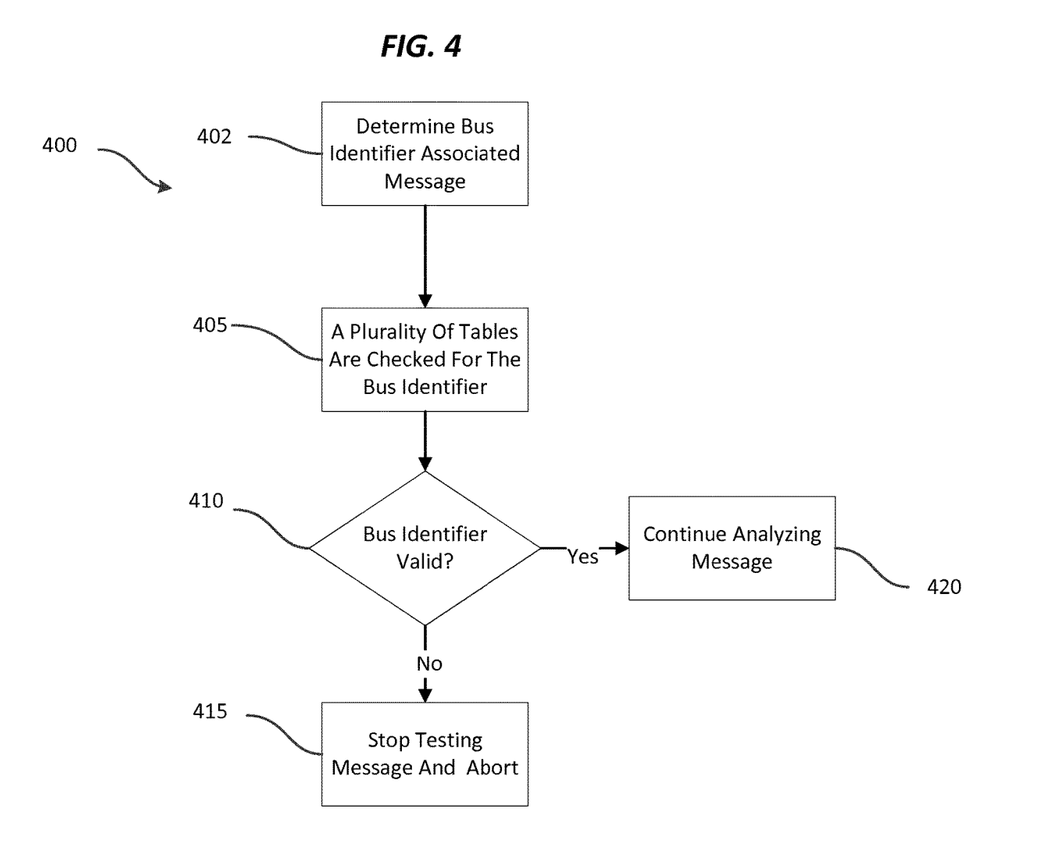
FIG. 4 is a flowchart of a method for checking a bus identifier of a message.

FIG. 4 illustrates an example method 400 for checking the bus identifier associated with a message received by the electronic processor 205. First, the bus identifier associated with the bus that delivered the message is determined (block 402). In some embodiments, the bus identifier is extracted from the message. In other embodiments, the bus identifier is determined based on which input/output interface (assuming that the electronic control unit 200 has multiple input/output interfaces similar to the input/output interface 215) receives the message and sends the message to the electronic processor 205. The electronic processor 205 searches one or more tables for the determined bus identifier (block 405). Each table is associated with a viable bus identifier (for example a CAN bus identifier). In some embodiments, if the electronic processor 205 does not find a table associated with the determined bus identifier, the electronic processor 205 aborts testing the message and aborts the execution of the message (block 415). If the electronic processor 205 finds a table associated with the determined bus identifier, the electronic processor 205 continues to analyze the message (block 420).

Figure 5:
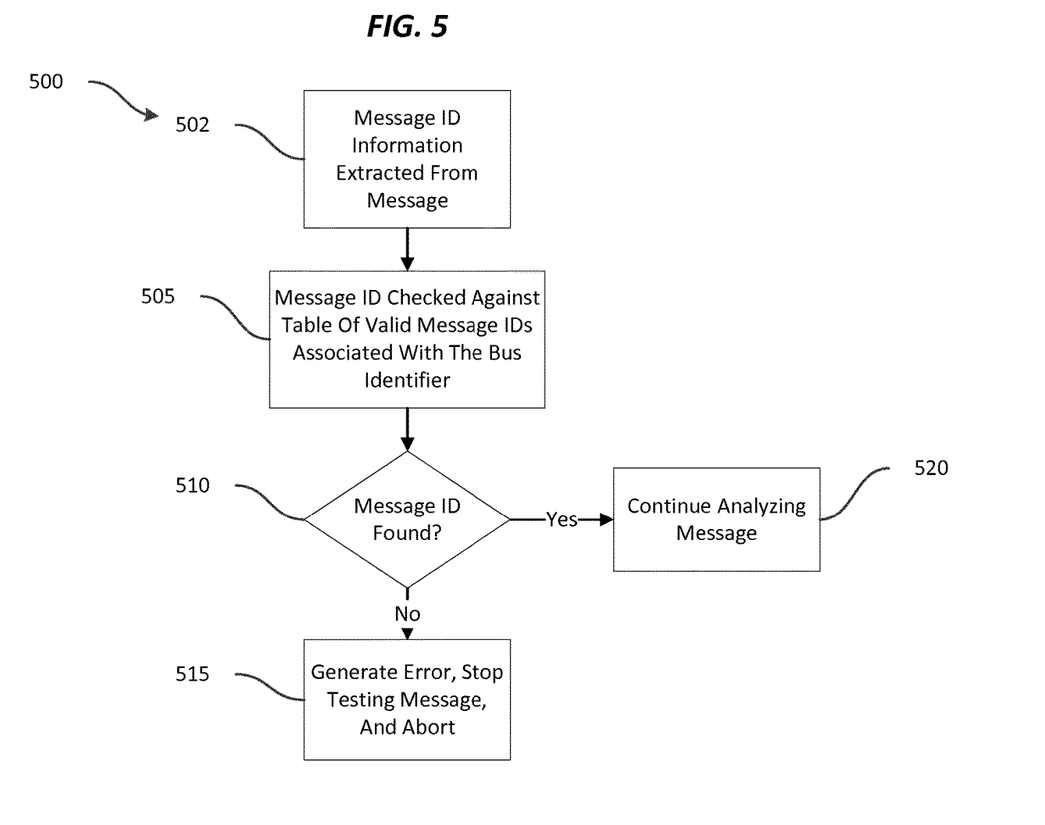
FIG. 5 is a flowchart of a method for checking that an identifier of a message is known.

FIG. 5 illustrates an example method 500 for checking the message identifier of the received message. The message identifier is extracted from the message (block 502). The electronic processor 205 searches a table for the message identifier of the message (block 505). The table contains valid message identifiers for the bus identifier of the message. In some embodiments, if the electronic processor 205 does not find the message identifier of the message in the table containing valid message identifiers for the bus identifier of the message, the electronic processor 205 generates an error, stops testing the message, and aborts the execution of the message (block 515). If the electronic processor 205 finds the message identifier of the message in the table, the electronic processor 205 continues to analyze the message (block 520).

Figure 6:
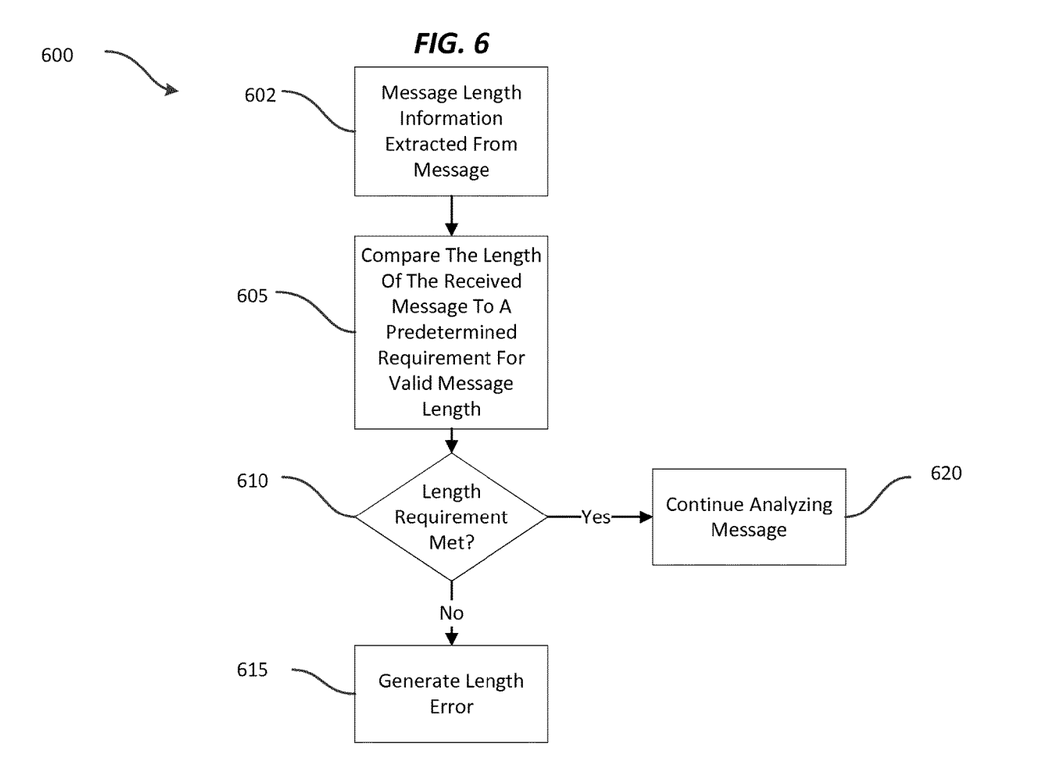
FIG. 6 is a flowchart of a method for checking that a length of a message is correct.

FIG. 6 illustrates an example method 600 for checking the length of the received message. A predetermined requirement for valid message length is stored in the memory 210. The predetermined requirement for valid message length may be a minimum message length, a maximum message length, or other message length. The electronic processor 205 extracts the length of the message (for example, the data length code (DLC) of the message) (block 602) and compares the length of the message to the predetermined requirement for valid message length stored in the memory 210 (block 605). If the length of the message does not meet the predetermined requirement for valid message length (block 610), the electronic processor 205 generates an error (block 615) and, in some embodiments, continues to test the message. If the length of the message meets the predetermined requirement for valid message length (block 610), the electronic processor 205 continues to test the message (block 620).

Figure 7:
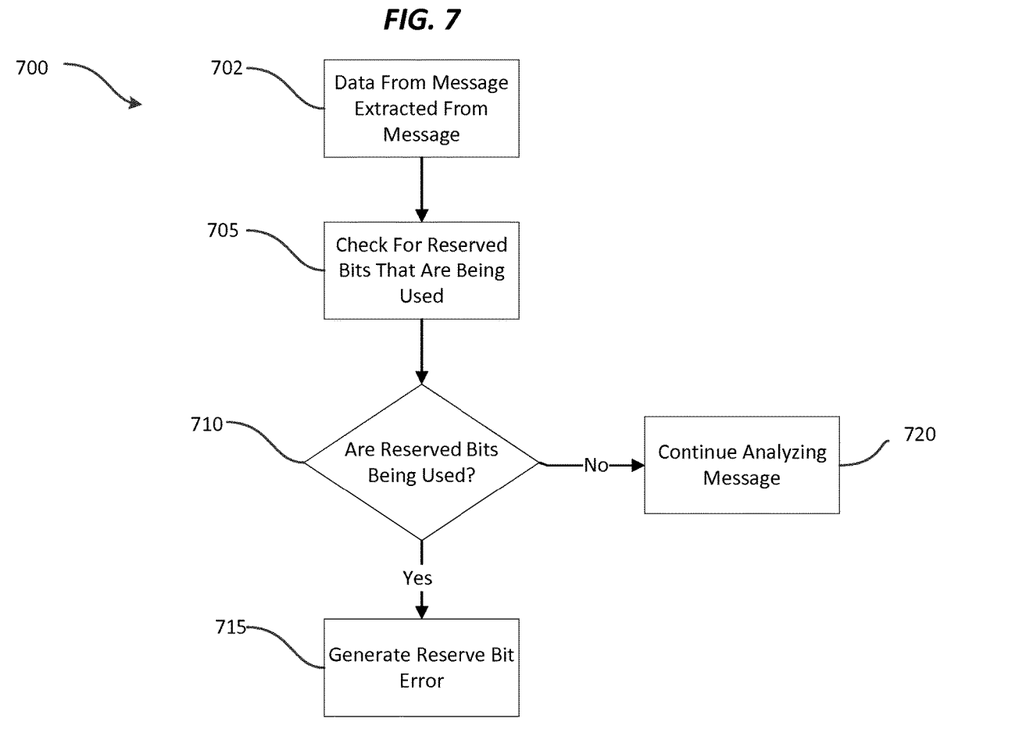
FIG. 7 is a flowchart of a method for checking that reserved bits of a message are not being used.

FIG. 7 illustrates an example method 700 for checking that reserved bits of the message are valid. Reserved bits are defined as bits that should not be used or are not assigned to a signal. The electronic processor 205 extracts data, including the reserved bits, from the message (block 702) and checks that the reserved bits are not being used (block 705). If the reserved bits of the message are being used (block 710), the electronic processor 205 generates an error (block 715) and, in some embodiments, continues to test the message. If the received message's reserved bits are not being used (block 710), the electronic processor 205 continues to test the message (block 720).

Figure 8:
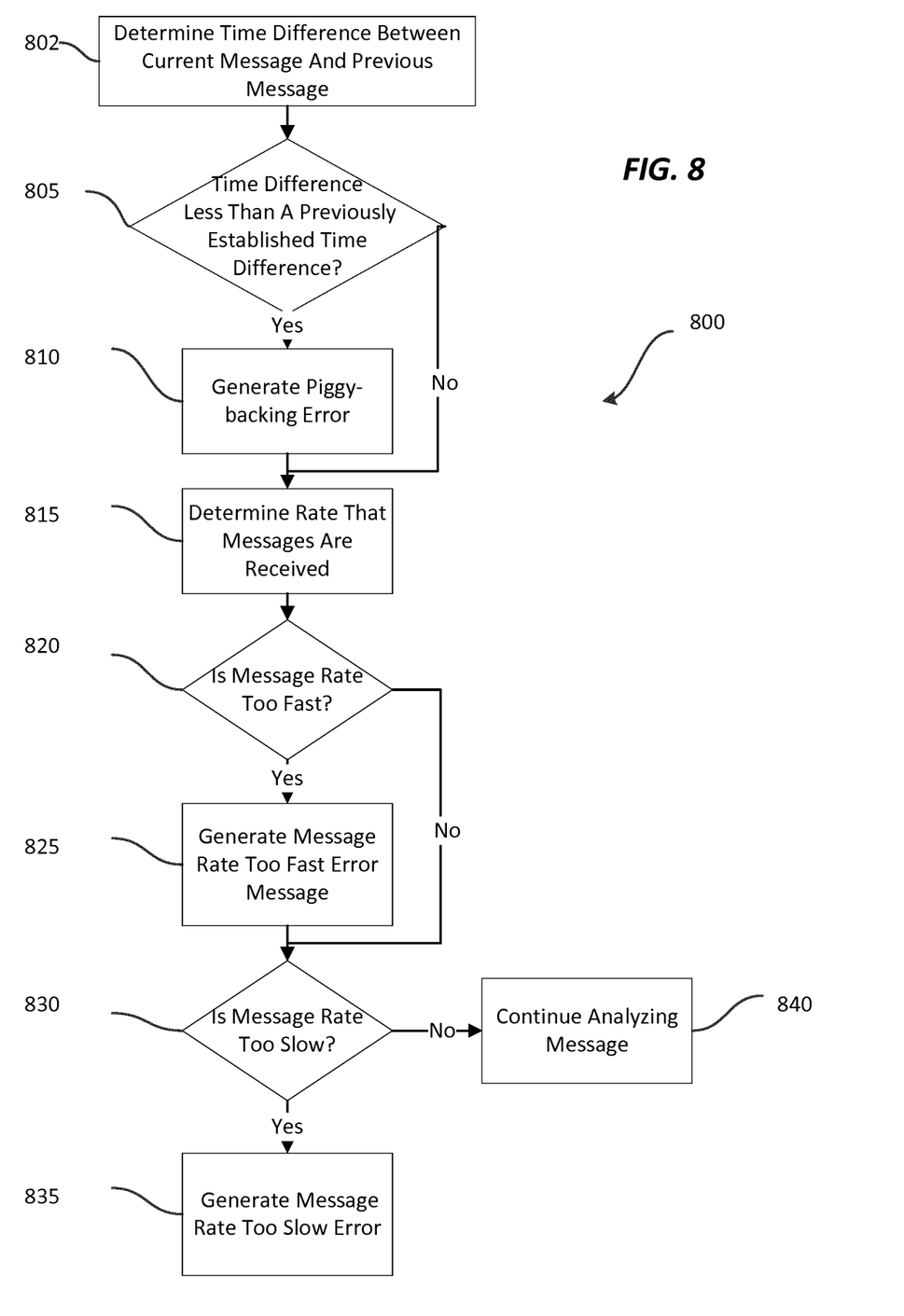
FIG. 8 is a flowchart of a method for checking that messages are being received at the correct time and rate.

FIG. 8 illustrates an example method 800 for checking that messages are being received at an appropriate rate and time (detecting anomalies in a time that a message is received). In the example illustrated, the electronic processor 205 calculates an amount of time that has elapsed (a time difference) between receiving a current message and receiving a previous message with the same message identifier as the current message (block 802). For every message identifier, the electronic processor 205 has (stored in the memory 210) an amount of time which should have elapsed between messages (a previously established time difference). The electronic processor 205 checks that the amount of time that has elapsed is greater than or equal to the amount of time which should have elapsed (block 805). If the amount of time that has elapsed is not greater than or equal to (or the amount of time that has elapsed is less than) the amount of time which should have elapsed, the electronic processor 205 generates an error (block 810) and, in some embodiments, continues to test the message. If the electronic processor 205 determines the rate that messages are received is too fast (block 820) (for example, by determining if the time difference is above a first predetermined threshold value), the electronic processor 205 generates an error (block 825) and, in some embodiments, continues to test the message. If the electronic processor 205 determines the rate that messages are received is too slow (block 830) (for example, by determining if the time difference is below a second predetermined threshold value), the electronic processor 205 generates an error (block 835) and, in some embodiments, continues to test the message.

Figure 9:
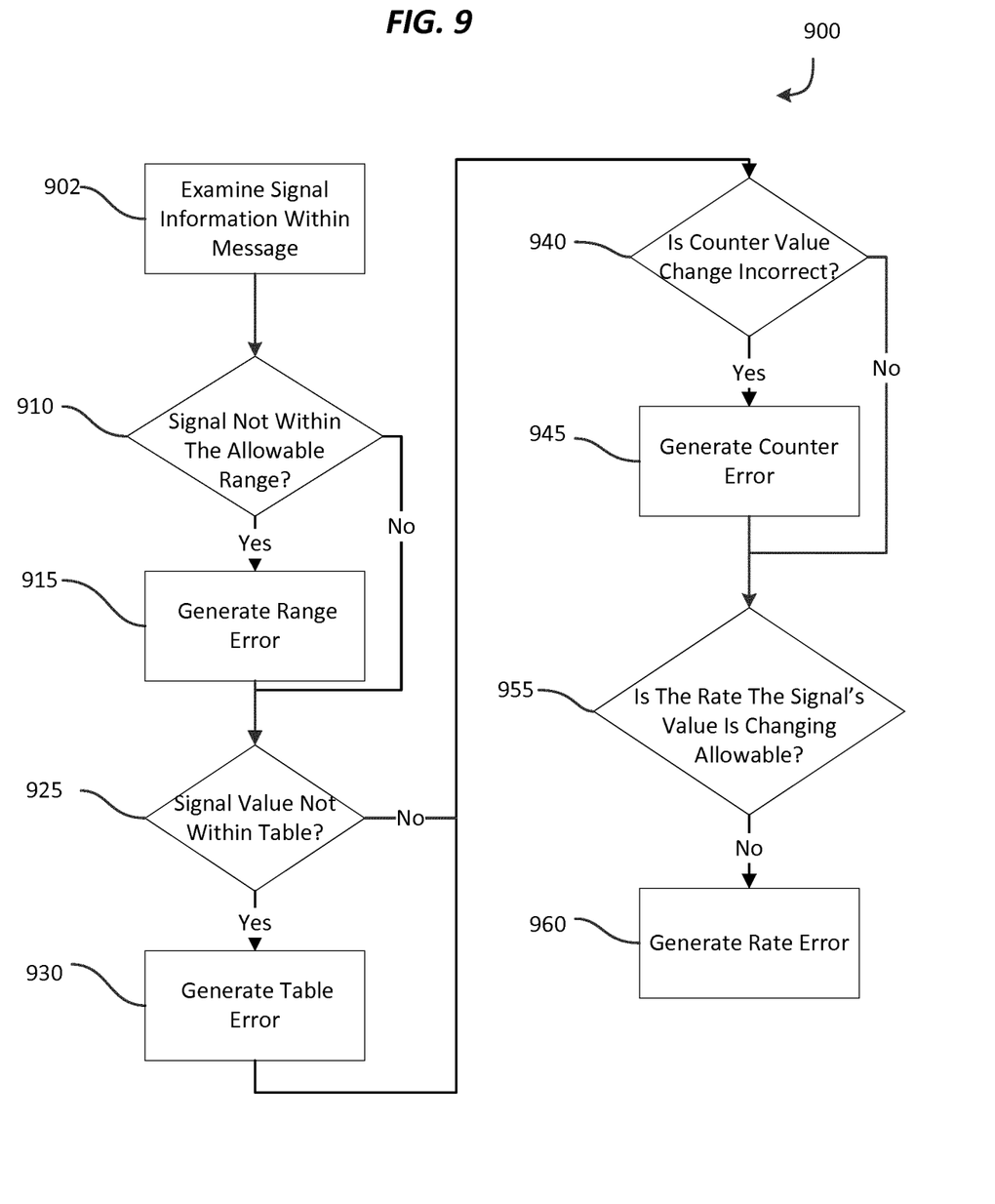
FIG. 9 is a flowchart of a method for checking signal parameters of signals included in a message.

FIG. 9 illustrates an example method 900 for checking the signal parameters of a signal. In the example illustrated, the electronic processor 205 checks that the signal is within a predetermined allowable range (block 910). The allowable range is, for example, a range of linear values. If the signal is not within the predetermined allowable range, the electronic processor 205 generates an error (block 915). In some embodiments, the electronic processor 205 may check that the signal is not within a predetermined unallowable range. The unallowable range is, for example, a range of linear values. If the signal is within the predetermined unallowable range, the electronic processor 205 generates an error (block 915). A table of valid signal values is stored in memory 210. In one embodiment, the electronic processor 205 searches the table for the signal value of the signal (block 925). If the signal value of the signal is not in the table, the electronic processor 205 generates an error (block 930). In some embodiments, a table of invalid signal values is stored in memory 210. The electronic processor 205 searches the table for the signal value of the signal. If the signal value of the signal is in the table, the electronic processor 205 generates an error. The electronic processor 205 also checks if the signal is a counter value or, more simply, a counter. If the signal is a counter, the electronic processor 205 checks if the counter has increased or decreased by one (or been updated correctly) (block 940). If the counter has increased or decreased by more than one, the electronic processor 205 generates an error (block 945). In some embodiments, the electronic processor 205 also generates an error if the counter that is supposed to continually increase (or decrease) has not increased (or decreased).

The electronic processor 205 also checks that the value of the signal changes at an allowable rate (block 955). Checking the rate at which the value of the signal changes includes a plurality of tests. For example, a test included in the plurality of tests for checking the rate at which the value of the signal changes checks if the value of the signal changes by more than a predetermined threshold between two messages received consecutively. If the value of the signal changes by more than the predetermined threshold, the electronic processor 205 generates an error (block 960). Another example of a test included in the plurality of tests compares, to a predetermined threshold, an amount the signal has changed from the beginning of a predetermined time period to the end of the predetermined time period. For example, if a signal has a value of five at the beginning of a predetermined time period and a value often at the end of the predetermined time period then the electronic processor 205 will compare the value of 5 to the predetermined threshold. If the value of the signal changes by more than the predetermined threshold in the predetermined time period, the electronic processor 205 generates an error (block 960). Yet another example of a test included in the plurality of tests checks if fluctuations of the signal value within a predetermined time period are greater than a predetermined amount. In some embodiments, the fluctuations of the signal value are the absolute value of the sum of delta values of the signal over the predetermined period of time. For example, if the signal changes from five to ten, then from ten to fifteen, from fifteen to five, and from five to zero during the predetermined period of time, the absolute value of the sum of the delta values of the signal is twenty-five. If the value of the signal fluctuates by more than the predetermined amount in the predetermined time period, the electronic processor 205 generates an error (block 960).

Various features, advantages, and embodiments are set forth in the following claims.

What is claimed is:
1. A system for detecting a disruption in a communication system of a vehicle, the system comprising:
   a vehicle bus; and
   an electronic processor configured to,
      receive a message from the vehicle bus, the message having a format and a plurality of signals,
      test the message by detecting an anomaly in a bus identifier,
      test the message by detecting an anomaly in the format of the message,
      test the message by detecting an anomaly in a time the message is received,
      test the message by detecting an anomaly in a signal parameter of a signal of the plurality of signals, and
      generate an error when the anomaly in the format of the message, the anomaly in the time the message is received, or the anomaly in the signal parameter is detected.

2. The system according to claim 1, wherein the electronic processor is further configured to abort the test of the message when the anomaly in the bus identifier is detected.

3. The system according to claim 1, wherein detecting an anomaly in a bus identifier includes checking that the bus identifier is stored in a table.

4. The system according to claim 1, wherein detecting an anomaly in the format of the message includes performing at least one selected from a group consisting of detecting an anomaly in a message identifier, detecting an anomaly in a length of the message, and detecting an anomaly in reserved bits of the message.

5. The system according to claim 4, wherein detecting an anomaly in a message identifier includes extracting the message identifier from the message and checking that the message identifier is stored in a table containing valid message identifiers for the bus identifier of the message.

6. The system according to claim 5, wherein the electronic processor is configured to generate an error, and abort further testing of the message if the message identifier is not stored in the table containing valid message identifiers for the bus identifier of the message.

7. The system according to claim 4, wherein detecting an anomaly in a length of the message includes extracting the length of the message from the message and checking that the length of the message meets a predetermined requirement for valid message length.

8. The system according to claim 4, wherein detecting an anomaly in reserved bits of the message includes extracting data from the message and checking if the reserved bits of the message are being used.

9. The system according to claim 1, wherein detecting an anomaly in a time that the message is received includes
calculating, a time difference between the time the message is received and a time a previous message was received;
determining, if the time difference is less than a previously established time difference;
determining, if the rate that messages are received is above a first predetermined threshold value or below a second predetermined threshold value;
generating, with the electronic processor, an error when the anomaly in the rate that messages are received is detected; and
wherein a message identifier of the previous message and a message identifier of the message are the same.

10. The system according to claim 1, wherein detecting an anomaly in a signal parameter of a signal of the plurality of signals includes
checking, a value of the signal is within a predetermined allowable range;
checking, the value of the signal is not within a predetermined unallowable range;
checking, the value of the signal is not stored in a table of invalid signal values;
checking, the value of the signal is stored in a table of valid signal values;
checking, the value of the signal changes at an allowable rate; and
if the signal is a counter, checking the counter has been updated correctly.

11. A method for detecting a disruption in a communication system of a vehicle, the method comprising:
receiving, with an electronic processor, a message from a vehicle bus, the message having a format and a plurality of signals;
testing the message, with the electronic processor, by detecting an anomaly in a bus identifier,
detecting, with the electronic processor, an anomaly in the format of the message,
detecting, with the electronic processor, an anomaly in a time the message is received, and
detecting, with the electronic processor, an anomaly in a signal parameter of a signal of the plurality of signals; and
generating, with the electronic processor, an error when the anomaly in the format of the message, the anomaly in the time the message is received, or the anomaly in the signal parameter is detected.

12. The method according to claim 11, wherein detecting an anomaly in a bus identifier includes checking that the bus identifier is associated with a table.

13. The method according to claim 11, the method further comprising aborting further testing of the message if the anomaly in the bus identifier is detected.

14. The method according to claim 11, wherein detecting an anomaly in the format of the message includes at least one selected from a group consisting of detecting an anomaly in a message identifier, detecting an anomaly in a length of the message, and detecting an anomaly in reserved bits of the message.

15. The method according to claim 14, wherein detecting an anomaly in a message identifier includes extracting the message identifier from the message and checking that the message identifier is stored in a table containing valid message identifiers for the bus identifier of the message.

16. The method according to claim 15, the method further comprising generating an error, and aborting further testing of the message if the message identifier is not stored in the table containing valid message identifiers for the bus identifier of the message.

17. The method according to claim 14, wherein detecting an anomaly in a length of the message includes extracting the length of the message from the message and checking that the length of the message meets a predetermined requirement for valid message length.

18. The method according to claim 14, wherein detecting an anomaly in reserved bits of the message includes extracting data from the message and checking if the reserved bits of the message are being used.

19. The method according to claim 11, wherein detecting an anomaly in a time the messages are received includes
calculating, a time difference between the time the message is received and a time a previous message was received;
determining, if the time difference is less than a previously established time difference;
determining, if the rate that messages are received is above a first predetermined threshold value or below a second predetermined threshold value;
generating, with the electronic processor, an error when the anomaly in the rate messages are received is detected; and
wherein a message identifier of the previous message and a message identifier of the message are the same.

20. The method according to claim 11, wherein detecting an anomaly in a signal parameter of a signal of the plurality of signals includes
checking, a value of the signal is within a predetermined allowable range;
checking, the value of the signal is not within a predetermined unallowable range;

checking, the value of the signal is not stored in a table of invalid signal values;
checking, the value of the signal is stored in a table of valid signal values;
checking, the value of the signal changes at an allowable rate; and
if the signal has a counter, checking the counter has been updated correctly.

\* \* \* \* \*